United States Patent
Lin et al.

(10) Patent No.: US 11,212,355 B2
(45) Date of Patent: Dec. 28, 2021

(54) METHOD AND DEVICE FOR REDIRECTING TRAFFIC

(71) Applicant: WANGSU SCIENCE & TECHNOLOGY CO., LTD., Shanghai (CN)

(72) Inventors: Zhangkun Lin, Shanghai (CN); Xiaopeng Liu, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 863 days.

(21) Appl. No.: 15/778,886

(22) PCT Filed: Jun. 16, 2017

(86) PCT No.: PCT/CN2017/088544
§ 371 (c)(1),
(2) Date: May 24, 2018

(87) PCT Pub. No.: WO2018/209745
PCT Pub. Date: Nov. 22, 2018

(65) Prior Publication Data
US 2021/0203738 A1 Jul. 1, 2021

(30) Foreign Application Priority Data
May 16, 2017 (CN) .......................... 201710341240.1

(51) Int. Cl.
*G06F 15/173* (2006.01)
*H04L 29/08* (2006.01)
(Continued)

(52) U.S. Cl.
CPC ...... *H04L 67/2814* (2013.01); *H04L 47/2483* (2013.01); *H04L 47/32* (2013.01)

(58) Field of Classification Search
CPC . H04L 67/2814; H04L 47/32; H04L 47/2483; H04L 69/162; H04L 69/166
See application file for complete search history.

(56) References Cited

U.S. PATENT DOCUMENTS

| 6,687,732 B1 * | 2/2004 | Bector | H04L 29/12009 |
| | | | 709/200 |
| 2010/0132031 A1 * | 5/2010 | Zheng | H04L 63/1416 |
| | | | 726/13 |

(Continued)

FOREIGN PATENT DOCUMENTS

| CN | 102594876 A | 7/2012 |
| CN | 105101147 A | 11/2015 |

(Continued)

OTHER PUBLICATIONS

The European Patent Office (EPO) The Extended European Search Report for 17906785.5 (pct/cn2017/088544) dated Jun. 5, 2019, 8 Pages.

*Primary Examiner* — Yves Dalencourt

(57) ABSTRACT

A traffic redirecting method and a device are provided. The method includes: redirecting traffic to a proxy service module of a first proxy server; via the proxy service module, recognizing the traffic; and based on a recognition result, selecting a corresponding redirecting rule to redirect the traffic. The redirecting rule includes redirecting the traffic back to the source, redirecting the traffic to a traffic processing server, redirecting the traffic to a second proxy server, and discarding the traffic.

19 Claims, 4 Drawing Sheets

(51) Int. Cl.
*H04L 12/851* (2013.01)
*H04L 12/823* (2013.01)

(56) References Cited

U.S. PATENT DOCUMENTS

| | | | |
|---|---|---|---|
| 2011/0119331 A1* | 5/2011 | Zhang | H04L 67/2814 |
| | | | 709/203 |
| 2013/0031600 A1* | 1/2013 | Luna | G06F 21/56 |
| | | | 726/1 |
| 2016/0352683 A1 | 12/2016 | Cooper et al. | |
| 2020/0259797 A1* | 8/2020 | Fan | H04L 67/28 |

FOREIGN PATENT DOCUMENTS

| | | |
|---|---|---|
| CN | 105791315 A | 7/2016 |
| CN | 106130997 A | 11/2016 |
| EP | 2182694 A1 | 5/2010 |

* cited by examiner

METHOD AND DEVICE FOR REDIRECTING TRAFFIC

CROSS-REFERENCES TO RELATED APPLICATIONS

This application is a national phase entry under 35 U.S.C § 371 of International Application No. PCT/CN2017/088544 filed on Jun. 16, 2017, which claims priority of Chinese Patent Application No. 201710341240.1, filed with the State Intellectual Property Office of P. R. China on May 16, 2017, the entire contents of all of which are incorporated herein by reference.

FIELD OF THE DISCLOSURE

The present disclosure generally relates to the technical field of computer network data and, more particularly, relates to a method and a device for redirecting traffic.

BACKGROUND

As the internet technology develops rapidly, the demand on grooming of the client traffic grows increasingly, and transparent proxy is one of the common technologies used for traffic grooming. By using transparent proxy, the client no longer needs to know the existence of the proxy server, that is, the user does not need to do any configuration. The traffic requested by the client may pass through the device acting as a transparent proxy (e.g., a router), and the transparent proxy may acquire the destination internet protocol (IP) address and the port to be accessed by the client, and get the response source. The transparent proxy is often applied to network address translation (NAT) forwarding of the router.

The existing transparent proxy technology has the following issues: (1) the existing technology can only perform back-to-source processing in terms of traffic forwarding; (2) the existing transparent proxy shows a single functionality, and does not have functions of traffic recognition and traffic grooming.

BRIEF SUMMARY OF THE DISCLOSURE

To solve issues in the existing technology, the present disclosure provides a method and device for redirecting traffic. The technical solutions are as follows.

In one aspect, a traffic redirecting method is provided, comprising the following steps:
  redirecting a traffic to a proxy service module of a first proxy server; and
  recognizing, by the proxy service module, the traffic, and based on a recognition result, selecting, by the proxy service module, a corresponding redirecting rule to redirect the traffic,
  where the redirecting rule may include redirecting the traffic back to the source directly, redirecting the traffic to a traffic processing server, redirecting the traffic to a second proxy server, and discarding the traffic.

Further, when an operation mode of the first proxy server is a local proxy service mode, redirecting traffic to a proxy service module of a first proxy server may include redirecting the traffic sent by a client to a local end via a switch or a network bridge and, further redirecting the traffic to the proxy service module via a traffic hijacking module of the first proxy server. When the operation mode of the first proxy server is a remote proxy service mode, redirecting traffic to a proxy service module of a first proxy server may include redirecting the traffic to the proxy service module based on the redirecting rule.

More specifically, a method of redirecting, via the traffic hijacking module, the traffic to the proxy service module specific includes:
  for transmission control protocol (TCP) traffic, redirecting the TCP traffic to the proxy service module by configuring an iptables rule;
  for user datagram protocol (UDP) traffic, redirecting the UDP traffic to the proxy service module by configuring the iptables rule, using the transparent proxy, and configuring a routing rule; and
  for internet control message protocol (ICMP) traffic or generic router encapsulation (GRE) protocol traffic, redirecting the ICMP traffic or the GRE protocol traffic to a local loop back address to be acquired by the proxy service module by configuring the iptables rule, creating a mark, and configuring a routing rule.

Further, before recognizing, by the proxy service module, the traffic, the following steps may be included: executing the traffic to match on a pre-redirecting rule, and if the match is successful, redirecting the traffic based on a traffic redirecting rule corresponding to a pre-redirecting rule; if the match is not successful, recognizing the traffic.

More specifically, the pre-redirecting rule includes: an IP address redirecting rule, a port redirecting rule, and a cold-hot IP address rule.

More specifically, the first proxy server may communicate with the second proxy server via a private multiplexing protocol.

More specifically, an operation mode of the second proxy server is a remote proxy service mode.

More specifically, after receiving the traffic, the second proxy server recognizes the traffic and redirects the traffic based on a traffic redirecting rule corresponding to the recognition result.

More specifically, operating system kernels of the first proxy server and the second proxy server are Linux kernels.

In another aspect, a traffic redirecting device is provided, comprising: a first proxy server, a second proxy server, a source server, and a traffic processing server. The first proxy server and the second proxy server are connected, and are further connected to the source server and the traffic processing server, respectively. The first proxy server includes a traffic hijacking module and a proxy service module. The traffic hijacking module redirects the traffic to the proxy service module, and the proxy service module performs recognition and further redirection of the traffic.

Further, the first proxy server is connected to a client via a switch or a network bridge.

Further, the switch or the network bridge redirects the traffic from the client to the first proxy server, and the traffic hijacking module redirects the traffic from the client to the proxy service module.

Further, the proxy service module includes a traffic recognition unit, a protocol rule unit, and a traffic redirecting unit. After the proxy service module acquires the traffic, the traffic recognition unit executes recognition on the traffic, and based on a recognition result, the traffic redirecting unit acquires a corresponding traffic redirecting rule from the protocol rule unit and redirects the traffic based on the traffic redirecting rule.

Further, the traffic recognition unit includes an http (hypertext transfer protocol) sub-unit, a p2p (peer-to-peer) sub-unit, a game sub-unit, and a pptp (point-to-point tunneling protocol) sub-unit. The recognition result is obtained after the traffic has been recognized by such sub-units.

Further, the protocol rule unit stores a traffic redirecting rule corresponding to various traffic recognition results, and the traffic redirecting rule includes redirecting the traffic back to the source directly, redirecting the traffic to a traffic processing server, redirecting the traffic to a second proxy server, and discarding the traffic.

Further, the proxy service module may further include a pre-redirecting unit. After the proxy service module acquires the traffic, the pre-redirecting unit executes the traffic to match on the pre-redirecting rule. If the match is successful, the traffic enters the traffic redirecting unit to be redirected; and if the match is not successful, the traffic enters the traffic recognition unit for recognition, and based on a recognition result, the traffic redirecting unit redirects the traffic.

Further, the first proxy server may communicate with the second proxy server via a private multiplexing protocol.

Beneficial effects brought by technical solutions in embodiments of the present disclosure are as follows: the present disclosure uses iptables to hijack the traffic and applies a redirecting and transparent proxy method to redirect the traffic sent by the client to a local proxy service; the local proxy service may perform traffic recognition on the hijacked traffic, and correspondingly redirect different recognized traffic based on the configured rule, thereby redirecting the different traffic to different proxy servers, or sending the traffic back to the source locally, or discarding the traffic. Based on the transparent proxy technology, the present disclosure not only realizes intelligent grooming of the traffic without requiring the client to perform any additional configuration, but also solves issues that the conventional transparent proxy only performs network address conversion and back-to-source, which shows a single functionality, and fails to perform recognition or intelligent grooming of the traversed traffic.

BRIEF DESCRIPTION OF THE DRAWINGS

To more clearly illustrate the technical solution in the present disclosure, the accompanying drawings used in descriptions of the disclosed embodiments are briefly introduced hereinafter. Obviously, the drawings described below are merely some embodiments of the present disclosure. Other drawings derived from such drawings may be obtainable by those ordinarily skilled in the relevant art without creative labor.

DETAILED DESCRIPTION

Figure 1:
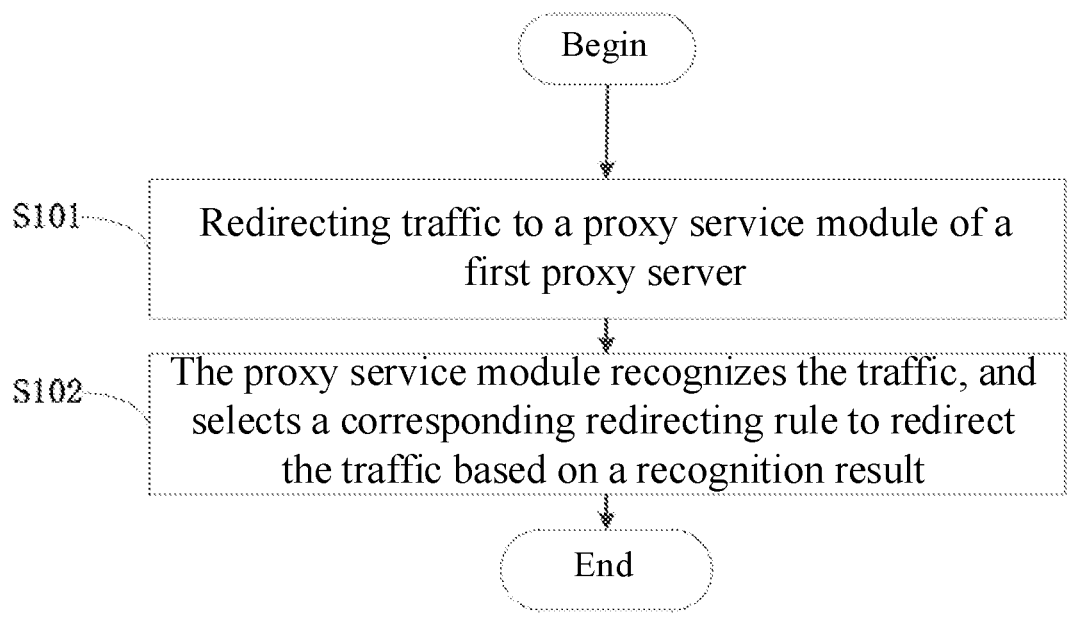
FIG. 1 illustrates a flow chart of a traffic redirecting method provided by embodiments of the present disclosure.

To more clearly describe the objectives, technical solutions and advantages of the present disclosure, embodiments of the present disclosure will be made in detail with reference to the accompanying drawings hereinafter. Those skilled in the relevant art may easily understand other advantages and functions of the present disclosure from content disclosed in the present specification. The present disclosure may be further realized or practiced through different additional specific implementations, and various details of the present specification may be modified or altered based on different points of views and applications without departing from the spirit of the present disclosure. It should be noted that, without conflict, embodiments below and characteristics of the embodiments may be combined.

Drawings provided by the following embodiments are only for illustrating the basic principles of the present disclosure, and as a result, the accompanying drawings only illustrate components related to the present disclosure and are not depicted based on the number, shape, and dimension of the components in actual implementation. That is, in actual implementation, configurations, numbers and ratios of different components may be randomly altered, and the layout configuration of the components may be more complicated.

First, technical terms in the specification of the present disclosure are illustrated and explained. Below is the illustration of the technologies of the present disclosure, and the present disclosure is not limited thereto.

The term "IP address" refers to internet protocol address. The IP address is a uniform address format provided by the IP protocol and, the IP address allocates a logical address for each network and each host over the internet, thereby shielding differences between physical addresses.

The term "iptables" refers to an IP information packet filtering system that integrates the Linux kernel. Such system facilitates better control of the IP information packet filtering and firewall configuration in the Linux system. Further, iptables is a tool operating in the user space to define rules, and is not a firewall itself. The rules defined by iptables may be read by the netfilter (network filter) in a kernel space, and may allow the firewall to operate. Operating in the kernel, the iptables is configured to configure, maintain, and examine the IP packet filtering rules of the Linux kernel, and may organize the rules into a list, thereby realizing a detailed access control function. The iptables may define different tables, and each table may include a plurality of internal links, or may comprise links defined by the user. Each link is a rule list for matching a corresponding packet: each rule may define how to process a packet that matches the rule, or may jump to a link defined by the user in the same table.

The term "transparent proxy" indicates that the client does not need to know whether a proxy server exists. The transparent proxy changes request fields (packets) and may transmit actual IPs.

The term "target" refers to an operation corresponding to a rule of the iptables that is registered to netfilter, namely, an operation to be performed on the data packet that matches the rule, such as ACCEPT, and DROP, etc.

The "raw socket" may receive a data frame or a data packet from a local network card for listening the network traffic and analysis.

As shown in FIG. 1, FIG. 1 illustrates a flow chart of a traffic redirecting method provided by embodiments of the present disclosure. The traffic redirecting method may include the following steps:

Step S101: redirecting traffic to a proxy service module of a first proxy server.

More specifically, the disclosed first proxy server may include two operation modes: a local proxy service mode and a remote proxy service mode.

In the local proxy service mode, the traffic is redirected to the first proxy server by redirecting the traffic from a client to a local end via switch policy-based routing, ospf (open shortest path first) dynamic routing, or a network bridge direct-connecting manner. Further, the traffic hijacking module of the first proxy server redirects the traffic to a proxy service module of the first proxy server. More specifically, the traffic hijacking module forwards the hijacked traffic to a listening port of the proxy service module to be received by the proxy service module via the listening port.

In embodiments of the present disclosure, the traffic hijacking module may, based on different traffic types, apply corresponding methods to redirect different types of traffic to the proxy service module.

For transmission control protocol (TCP) traffic, by configuring an iptables rule, the TCP traffic is redirected to the local proxy service module. More specifically, by configuring the iptables rules in the local Linux system, the destination internet protocol (IP) address and the destination port of the traffic with a protocol type of TCP may be redirected as the IP address and the TCP port listened by the proxy service module. Accordingly, the TCP traffic redirected to the local end may be listened and received by the proxy service module.

For user datagram protocol (UDP) traffic, by configuring the iptables rule and using the transparent proxy, the UDP traffic may be redirected to the proxy service module. More specifically, by configuring the iptables rule in the local Linux system, the traffic with the protocol type of UDP may establish connection with the proxy service module via the transparent proxy, and the UDP traffic is marked. Further, local policy-based routing is configured, and by designating a routing table to be searched by request of the marked traffic, further configuring local routing, and adding a default routing rule to the routing table, the marked UDP traffic is redirected to a local loop back address to be received by the proxy service module.

For internet control message protocol (ICMP) traffic or generic router encapsulation (GRE) protocol traffic, by configuring the iptables rule, creating a mark and configuring the routing rule, the ICMP traffic or the GRE protocol traffic may be redirected to the local loop back address to be acquired by the proxy service module.

More specifically, by configuring the iptables rule in the local Linux system, marking the traffic with a protocol type of ICMP or GRE, configuring the local policy-based routing and the routing rule, and designating a routing table searched for by the marked traffic, the marked traffic may be sent to the local loop back address to be received by the local proxy service module. Because the ICMP traffic or the GRE traffic uses the raw socket, as long as the local loop back address is listened by the local proxy service module after the ICMP traffic or the GRE traffic is routed to the local loop back address, the proxy service module may receive the traffic via the raw socket.

As such, when the first proxy server is in the local proxy service mode, the traffic received by the first proxy server is the traffic obtained by using the local traffic hijacking module to forward the traffic from the client to a corresponding listening port.

When the operation mode of the first proxy server is a remote proxy service mode, the traffic redirected to the proxy service module of the remote first proxy server is the traffic redirected by other proxy server(s), and the proxy server module receives such traffic by listening of the corresponding port.

The difference between the remote proxy service mode and the local proxy service mode lies in that the sources of the traffic received by proxy server are different. In the local proxy service mode, the proxy server receives the traffic directly sent by the client, and in the remote proxy service mode, the traffic received by proxy server is traffic that has been processed by other proxy servers. Accordingly, when the proxy service module is in different operation modes, the ports listened by the proxy service module are different.

In the disclosed traffic redirecting method, the operation mode of the first proxy server may be the local proxy service mode or the remote proxy service mode, and the operation mode of the second proxy server is a remote proxy service mode.

In step S102, the proxy service module recognizes the traffic, and selects a corresponding redirecting rule to redirect the traffic based on a recognition result.

After the proxy service module receives the redirected traffic, the traffic may be recognized to be http traffic, p2p traffic, game traffic, pptp traffic, or default traffic. Based on the recognition result, a corresponding redirecting rule may be selected, and the traffic may be redirected based on the redirecting rule, including redirecting the traffic back to the source directly, redirecting the traffic to a traffic processing server, redirecting the traffic to a second proxy server, or discarding the traffic.

In the present disclosure, the traffic may be recognized to be the http traffic, the p2p traffic, the game traffic, the pptp traffic or the default traffic, and each recognition result has a corresponding redirecting rule. Such redirecting rule may be pre-configured, or may be configured based on actual demand. As such, the proxy service module not only performs recognition and differentiation on the traffic, but also performs classification and redirection based on different traffic types, thereby grooming the traffic more intelligently. Further, redirecting rule corresponding to different traffic types may be configured, respectively, thereby grooming the traffic more clearly and accurately. Further, corresponding adjustment may be performed based on the actual demand.

It should be noted that, in the present disclosure, the rule for recognizing the traffic may be adjusted based on the actual demand. For example, in some embodiments, the http traffic and the game traffic may be recognized and a corresponding redirecting rule may be configured, while other traffic may be uniformly redirected based on a configured rule. Further, the recognized types of the traffic may be configured, for example, the traffic may be recognized to be TCP traffic, UDP traffic, etc., and by recognizing the traffic from other perspectives, the actual demand of the application scenarios may be better satisfied.

In embodiments of the present disclosure, the first proxy server may communicate with the second proxy server via a private multiplexing protocol, thereby realizing the transmission of a plurality of requests in a single TCP passage to save the usage of the port. The traffic processing server includes but is not limited to squid server and p2pcs (peer-to-peer computing system) cache server.

As such, by using the traffic redirecting method according to the present disclosure, not only the traffic may be recognized, but the recognized traffic may be redirected, respectively. Further, the redirecting manners may be configured based on demand, thereby solving issues that the conventional transparent proxy can only perform network address conversion and back-to-source, which shows a single functionality and fails to perform recognition or intelligent grooming of the traversed traffic.

Figure 2:
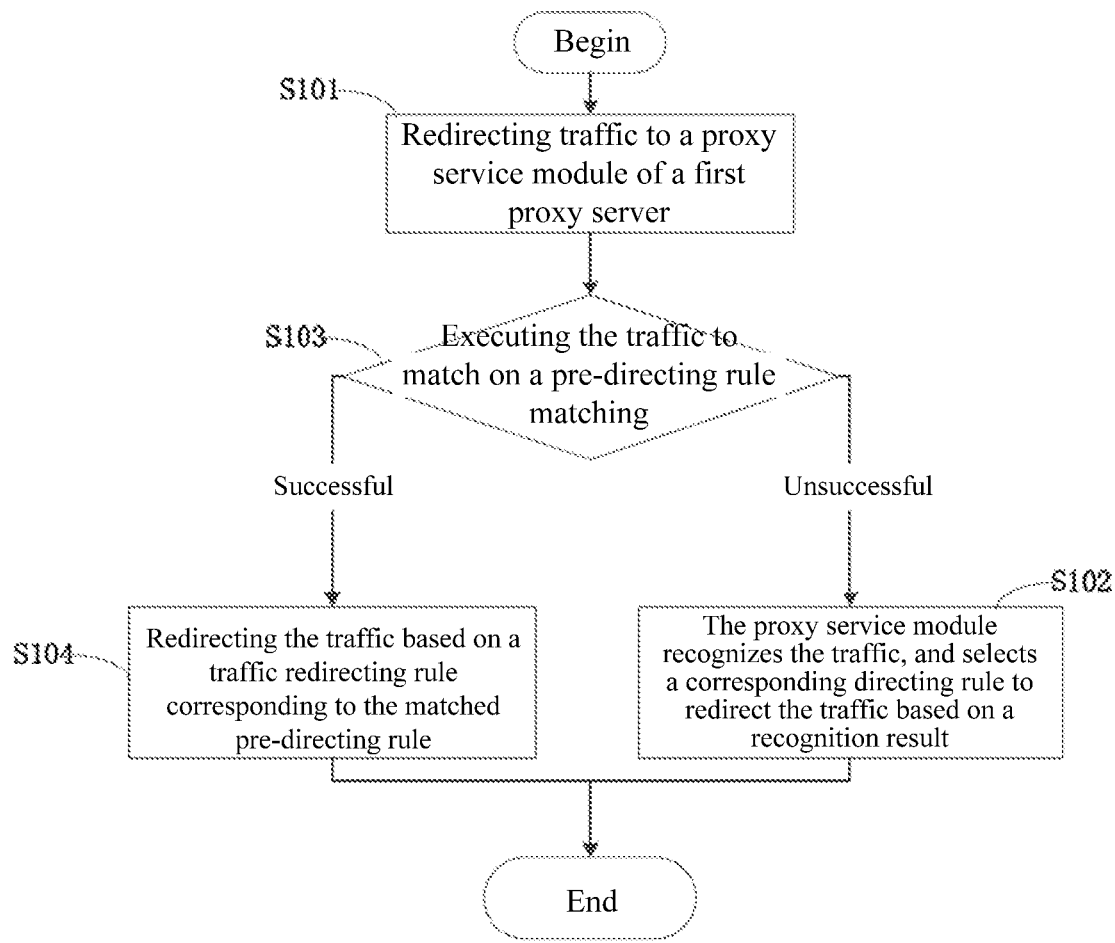
FIG. 2 illustrates another flow chart of a traffic redirecting method provided by embodiments of the present disclosure.

In another embodiment of the present disclosure, as shown in FIG. 2, different from the example illustrated in FIG. 1, before step S102, the method further comprises:

Step S103, executing the traffic to match on the pre-redirecting rule.

After the traffic is redirected to the proxy service module of the first proxy server using step S101, the traffic is matched based on a preset pre-redirecting rule. If the match is successful, step S104 is jumped to, and if the match is not successful, step S102 is jumped to.

More specifically, by executing the traffic to match on the pre-redirecting rule, certain traffic may be pre-filtered. For example, the traffic that accesses an IP known as a hot IP may be redirected without recognition. Or, for traffic by mistake or an offensive traffic, the traffic may be hijacked in advance via the pre-redirecting rule matching, and such traffic may be correspondingly processed. That is, the introduction of the step of pre-redirecting rule matching is to further improve the grooming method of the traffic, such that certain traffic may be directly and specifically processed to improve the overall performance and intelligence. Further, the pre-redirecting rule is a rule preset in the proxy service module, mainly including: an IP address redirecting rule, a port redirecting rule, and a cold-hot IP address rule. More specifically, the IP address redirecting rule performs redirecting via a source IP address or a destination IP address requested by the traffic. The port redirecting rule performs redirecting via a requested destination port. The cold-hot address rule may calculate the behavior of the client traffic via historical data, for example, the cold-hot address rule may calculate the most frequently accessed destination IP addresses, thereby forming a redirecting solution of the cold-hot IP addresses.

It should be understood that, the pre-redirecting rule may be configured based on actual demand, and is not limited to descriptions herein in the present specification.

In Step S104, redirecting is performed based on a traffic redirecting rule corresponding to a pre-redirecting rule.

When the pre-redirecting rule matching on the traffic is successful, redirecting is performed based on the preset traffic redirecting rule corresponding to the pre-redirecting rule. The traffic redirecting rule may mainly include redirecting the traffic back to the source directly, redirecting the traffic to a traffic processing server, redirecting the traffic to a second proxy server, and discarding the traffic.

It should be understood that, the traffic redirecting rule is preset in the proxy service module and may be configured based on actual demand. The present disclosure is not limited to the descriptions in the present specification.

In one embodiment, step S101 and step S102 and other related descriptions herein are the same as that illustrated in FIG. 1, and thus are not repeated.

In one embodiment, by introducing the pre-redirecting rule matching, certain traffic may be specifically processed to improve the intelligence of the traffic redirecting method, thereby better satisfying the actual demand of the application scenarios.

Figure 3:
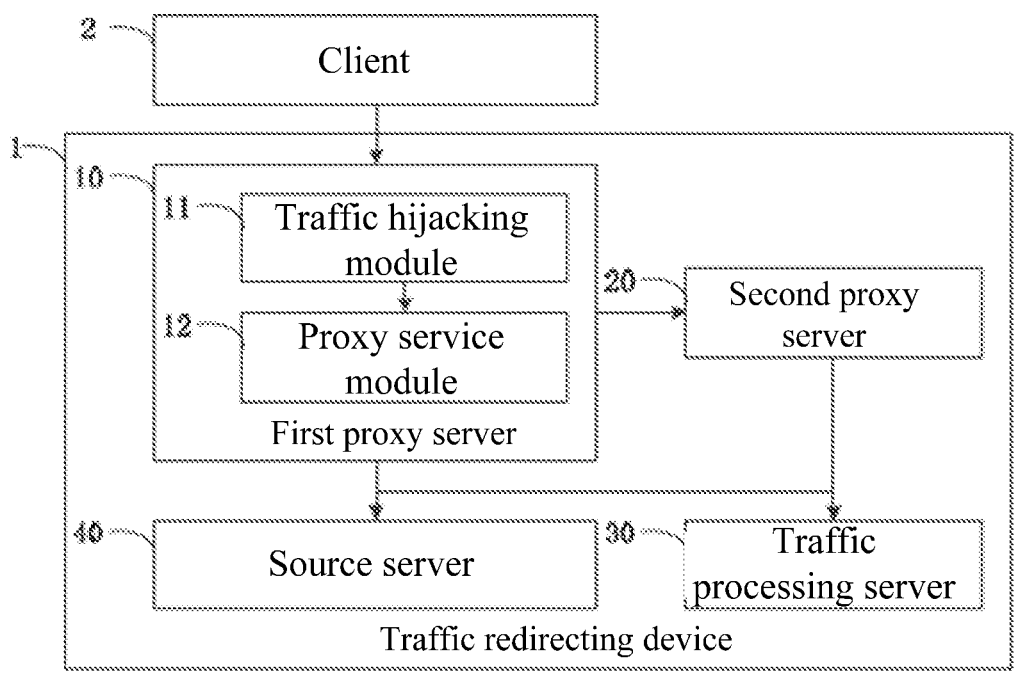
FIG. 3 illustrates a structural diagram of a traffic redirecting device provided by embodiments of the present disclosure.

Further, the present disclosure provides a traffic redirecting device 1. As shown in FIG. 3, the device 1 may include: a first proxy server 10, a second proxy server 20, a source server 30, and a traffic processing server 40. The first proxy server 10 and the second proxy server 20 may be connected, and may be further connected to the source server 30 and the traffic processing server 40, respectively.

The first proxy server 10 includes a traffic hijacking module 11 and a proxy service module 12.

The first proxy server 10 may have two operation modes: a local proxy service mode and a remote proxy service mode.

In the local proxy service mode, the traffic hijacking module 11 redirects the traffic to the proxy service module 12, and such traffic is the traffic hijacked by the traffic hijacking module 11 after being redirected from a client to the first proxy server 10 via switch policy-based routing, ospf dynamic routing, or a network bridge direct-connecting manner. More specifically, the traffic hijacking module 11 forwards the hijacked traffic to a listening port of the proxy service module 12 to be received by the proxy service module 12 via the listening port.

In embodiments of the present disclosure, the traffic hijacking module 11 may, based on different traffic types, apply different methods to redirect the traffic to the proxy service module 12.

For transmission control protocol (TCP) traffic, by configuring an iptables rule, the TCP traffic may be redirected to the proxy service module 12. More specifically, by configuring the iptables rule in the local system, the destination internet protocol (IP) address and the destination port of the traffic with a protocol type of TCP may be redirected as the IP address and the TCP port listened by the proxy service module 12. Accordingly, the TCP traffic redirected to a local end may be listened and received by the proxy service module 12.

For user datagram protocol (UDP) traffic, by configuring the iptables rule and using the transparent proxy, the UDP traffic may be redirected to the proxy service module 12. More specifically, by configuring the iptables rule in the local system, the traffic with the protocol type of UDP may establish connection with the proxy service module 12 via the transparent proxy, and the UDP traffic may be marked. Further, by configuring local policy-based routing, designating a routing table to be searched by requested of the marked traffic, further configuring local routing, and adding a default routing rule in the routing table, the marked UDP traffic may be sent to the local loop back address to be received by the proxy service module 12.

For internet control message protocol (ICMP) traffic or generic router encapsulation (GRE) protocol traffic, by configuring the iptables rule, creating a mark, and configuring a routing rule, the ICMP traffic or the GRE protocol traffic may be redirected to the local loop back address to be acquired by the proxy service module 12.

More specifically, by configuring the iptables rule in the local system, marking the traffic with a protocol type of ICMP or GRE, configuring the local policy-based routing and the routing rule, and designating a routing table searched for by the marked traffic, the marked traffic may be sent to the local loop back address to be received by the local proxy service module. Because the ICMP traffic or the GRE traffic uses the raw socket, as long as the local loop back address is listened by the local proxy service module after the ICMP traffic or the GRE traffic is routed to the local loop back address, the proxy service module may receive the traffic via the raw socket.

As such, when the first proxy server is in the local proxy service mode, the traffic received by the proxy service module 12 is the traffic obtained by using the local traffic hijacking module 11 to forward the client traffic to a corresponding listening port.

When the operation mode of the first proxy server 10 is a remote proxy service mode, the first proxy server 10 may be referred to as a remote proxy server, and the traffic redirected to the proxy service module 12 is the traffic redirected by other local or remote proxy servers. The proxy service module 12 receives the traffic by listening of the corresponding port.

Accordingly, in embodiments of the present disclosure, for proxy servers in different operation modes, the listening port of the proxy service module 12 may be adjusted correspondingly.

As shown in FIG. 3, in one embodiment, the first proxy server 10 may be connected to a client 2 via the switch policy-based routing or the ospf dynamic routing or the network bridge direct-connecting manner (not shown), and the traffic sent by the client 2 is received by the first proxy server 10. Further, the traffic received by the second proxy server 20 is from the first proxy server 10, but not directly from the client 2. Thus, in the present example, a current operation mode of the first proxy server 10 is the local proxy service mode, and a current operation mode of the second proxy server 20 is the remote proxy service mode. It is worth noting that the operation mode of the disclosed proxy servers may be adjusted based on actual demand, and is not limited to a fixed operation mode.

Figure 4:
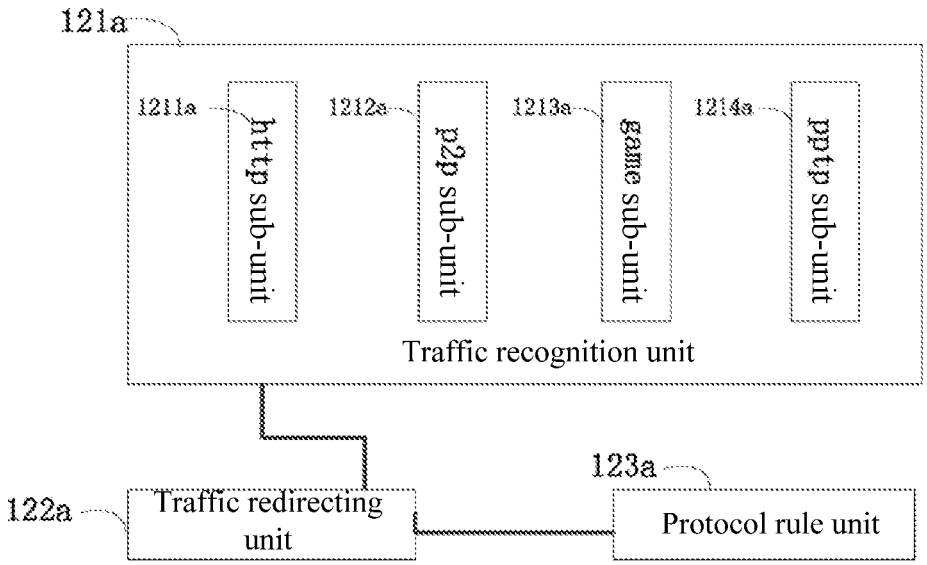
FIG. 4 illustrates a structural diagram of a proxy service module in FIG. 3.

As shown in FIG. 4, FIG. 4 illustrates a structural diagram of a proxy service module 12 of a first proxy server 10 according to the disclosed embodiments. The first proxy service module 12 may include a traffic recognition unit 121a, a traffic redirecting unit 122a, and a protocol rule unit 123a. After the proxy service module 12 receives traffic, the traffic recognition unit 121 performs recognition on the traffic, and send the traffic and a recognition result to the traffic redirecting unit 122a. The traffic redirecting unit 122a receives the traffic, and based on the recognition result, acquires a corresponding redirecting rule from the protocol rule unit 123a for redirecting the traffic.

More specifically, the traffic recognition unit 121a includes an http sub-unit 1211a, a p2p sub-unit 1212a, a game sub-unit 1213a, and a pptp sub-unit 1214a. When the traffic recognition unit 121a recognizes the traffic, a result is obtained by using such sub-units to recognize the traffic. For example, the http sub-unit 1211a may first recognize the traffic to determine whether the traffic satisfies an http traffic characteristic. If the http characteristic is satisfied, the traffic is recognized to be http traffic, and the traffic and the recognition result are sent to the traffic redirecting unit 122a. If the http characteristic is not satisfied, the traffic and the recognition result are transmitted to other sub-units for recognition. If none of the aforementioned sub-units could provide a recognized structure of the traffic, the recognition result of the traffic is determined to be a default traffic and the traffic is further sent to the traffic redirecting unit 122a.

In embodiments of the present disclosure, the on-and-off of the aforementioned sub-units may be configured based on actual demand. For example, the http sub-unit and the game sub-unit may be turned on, and the p2p sub-unit and the pptp sub-unit may be turned off. Thus, the recognition result provided by the traffic recognition unit 121a may correspondingly include the http traffic, or the game traffic, or the default traffic.

The protocol rule unit 123a may include traffic redirecting rules corresponding to different recognition results, and such traffic redirecting rules include: redirecting the traffic directly back to the source (i.e., forwarding the traffic to the source server 40), redirecting the traffic to the traffic processing server 30, redirecting the traffic to the second proxy service module 20, or discarding the traffic. For example, if the recognition result of the traffic is http traffic, based on the traffic redirecting rule, the traffic may be directly sent back to the source, or the traffic is redirected to the traffic processing server, or the traffic is redirected to the second proxy server module or is discarded. Specific redirecting results may be selected based on a configured rule, for example, if the destination IP is configured to access the website of Baidu, the traffic is then sent back to source directly.

It should be understood that, the traffic redirecting rules in the protocol rule unit 123a may be configured based on actual demand. That is, the redirecting rules corresponding to various recognition results may be individually configured and are not associated. Further, content included in the specific redirecting rule corresponding to each recognition result may not be the same. For example, if the recognition result is the http traffic, the corresponding redirecting rule may include the aforementioned four types, and if the recognition result is the default traffic, and the corresponding redirecting rule may be to discard the traffic.

As such, in embodiments of the present disclosure, the traffic redirecting rules corresponding to different traffic recognition results may be respectively configured based on actual demand, such that the intelligence of traffic grooming may be further improved to better satisfy the actual demand.

Figure 5:
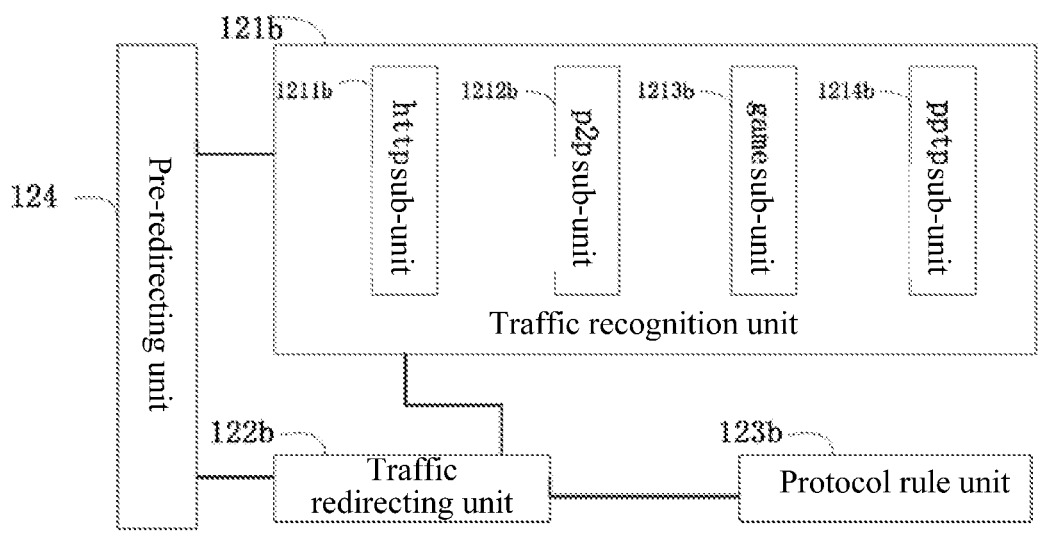
FIG. 5 illustrates a structural diagram of another proxy service module in FIG. 3.

FIG. 5 illustrate a structural diagram of another proxy service module in FIG. 3. As shown in FIG. 5, the proxy service module 12 may include a traffic recognition unit 121b, a traffic redirecting unit 122b, a protocol rule unit 123b, and a pre-redirecting unit 124. After the proxy service module 12 acquires the traffic, the pre-redirecting unit 124 may perform pre-redirecting rule matching of the traffic. If the matching is successful, the traffic enters the traffic redirecting unit 122b to be redirected. If the matching is not successful, the traffic enters the traffic recognition unit 121b for recognition, and the traffic and a recognition result are sent to the traffic redirecting unit 122b. Further, the traffic redirecting unit 122b receives the traffic, and acquires a corresponding redirecting rule from the protocol rule unit 123b based on the recognition result, thereby redirecting the traffic.

More specifically, the pre-redirecting unit 124 performs the pre-redirecting rule matching on the traffic. Further, the pre-redirecting unit 124 directly sends the successfully matched traffic to the traffic redirecting unit 122b, and the traffic redirecting unit 122b may, based on the corresponding traffic redirecting rule in the protocol rule 123b, redirect the traffic. The traffic that is not successfully matched enters the traffic recognition unit 121b for traffic recognition.

By performing pre-redirecting rule matching on the traffic, the pre-redirecting unit 124 pre-filters and directly sends certain traffic to the traffic redirecting unit 122b for traffic redirecting. For example, the traffic that accesses an IP known as a hot IP may be redirected without recognition, and the traffic by mistake or the offensive traffic may be hijacked in advance by the pre-redirecting rule matching and may be correspondingly processed. That is, the configuration of the pre-redirecting rule unit 124 is to further improve traffic grooming by the traffic redirecting device, such that certain traffic may be directly and specifically processed, thereby improving the overall performance and intelligence.

Further, the pre-redirecting rule is a rule preset in the proxy service module, mainly including: an IP address redirecting rule, a port redirecting rule, and a cold-hot IP address rule. More specifically, the IP address redirecting rule performs redirecting via a source IP address or a destination IP address requested by the traffic. The port redirecting rule performs redirecting via a requested destination port. The cold-hot address rule calculates a behavior of the client traffic via historic data, for example, the most frequently accessed destination IP address may be calculated, thereby forming a redirecting solution of the cold-hot IP addresses.

It should be understood that, the pre-redirecting rule may be configured based on actual demand, and is not limited to descriptions in the present specification.

In embodiments of the present disclosure, for the traffic successfully matches by the pre-redirecting unit 124, a result of pre-redirecting rule matching may include a further matching result, such as the matched traffic being a hot IP requested traffic or offensive traffic. The further matching result may also be sent to the traffic redirecting unit 122b, and the traffic redirecting unit 122b may redirect the traffic based on the redirecting rule corresponding to the matching result.

The traffic recognition unit 121b includes an http sub-unit 1211b, a p2p sub-unit 1212b, a game sub-unit 1213b, and a pptp sub-unit 1214b. The traffic recognition unit 121b may receive the not successfully matched traffic sent by the pre-redirecting unit 124 and recognize the traffic. When recognizing the traffic, a result is obtained by recognizing the traffic using the aforementioned sub-units. For example, the http sub-unit 1211b may first recognize the traffic to determine whether an http traffic characteristic is satisfied. If the http characteristic is satisfied, the traffic is recognized to be the http traffic, and the traffic and the recognition result are sent to the traffic redirecting unit 122b. If the http characteristic is not satisfied, the traffic and the recognition result are transmitted to other sub-units for recognition. If none of the sub-units could recognize the traffic, the recognition result of the traffic is determined to be a default traffic and the traffic is further sent to the traffic redirecting unit 122b.

In embodiments of the present disclosure, the on-and-off of the aforementioned sub-units may be configured based on actual demand. For example, the http sub-unit and the game sub-unit may be turned on, and the p2p sub-unit and the pptp sub-unit may be turned off. Thus, the recognition result provided by the traffic recognition unit 121a may include the http traffic, or the game traffic, or the default traffic.

The protocol rule unit 123b may include a traffic redirecting rule corresponding to the result of pre-redirecting rule matching and traffic redirecting rules corresponding to various traffic recognition results. Such traffic redirecting rules include: redirecting the traffic back to the source (i.e., forwarding the traffic to the source server 40), redirecting the traffic to the traffic processing server 30, redirecting the traffic to the second proxy service module 20, or discarding the traffic. For example, if the recognition result of the traffic is the http traffic, based on the traffic redirecting rule, the traffic may be directly sent back to the source, or the traffic is redirected to the traffic processing server, or the traffic is redirected to the second proxy server module or is discarded. Specific redirecting results may be selected based on the configured rules, for example, if the destination IP is configured to access the website of Baidu, the traffic is then sent back to source directly.

It should be understood that, the traffic redirecting rule in the protocol rule unit 123b may be configured based on actual demand. That is, the matching result and the redirecting rules corresponding to various recognition results are individually configured and are not associated. Further, content included in the specific redirecting rule corresponding to each recognition result may not be the same. For example, if the recognition result is the http traffic, the corresponding redirecting rule may include the aforementioned four types, and when the recognition result is the default traffic, and the corresponding redirecting rule may be to discard the traffic.

According to the present disclosure, by introducing the pre-redirecting unit 124 to perform the pre-redirecting rule matching, certain traffic may be specifically processed to improve the intelligence of the traffic redirecting method, thereby better satisfying the actual demand of the application scenarios.

In embodiments of the present disclosure, the structures included in the first proxy server and the second proxy server may be the same, and the corresponding functions being realized may be the same. The difference lies in that the operation modes in the current scenario may be different. In the example illustrated in FIG. 3, the operation mode of the first proxy server 10 is a local proxy service mode, such that the first proxy server 10 receives the traffic from the client 2, while the second proxy server 20 receives the traffic forwarded by the first proxy server 10. Under different operation modes, specific rules configured by the first proxy server 10 and the second proxy server 20 may be different, for example, the recognition rule in the traffic recognition unit and the traffic redirecting rule in the protocol rule unit may be varied.

In embodiments of the present disclosure, the first proxy server 10 may communicate with the second proxy server 20 via a private multiplexing protocol, thereby realizing the transmission of a plurality of requests in a single TCP passage to save the usage of the port. The traffic processing server 30 includes but is not limited to squid server and p2pcss cache server.

The present disclosure uses iptables to hijack traffic and applies a redirecting and transparent proxy method to redirect the traffic t local proxy service; traffic recognition is performed on the hijacked traffic, and corresponding grooming is performed based on a configured rule, such that the traffic may be redirected to different proxy servers, may be locally sent back to a source, or may be discarded directly. The present disclosure solves issues that the conventional transparent proxy can only perform network address conversion and back-to-source, which shows a single functionality and fails to recognize or intelligently redirect the traversed traffic.

The above-described sequence of embodiments of the present disclosure is for description purposes, and does not represent the preference of the disclosed embodiments.

The aforementioned device embodiments are merely for illustrative purpose. The units described as separated parts may or may not be physically detached. The parts displayed as units may or may not be physical units, i.e., may be located at one place, or distributed at a plurality of network units. Based on the actual needs, a part or all of the modules may be selected to achieve the objective of the embodiments. Those ordinarily skilled in the art may understand and implement the disclosed embodiments without contributing creative labor.

Through the descriptions of various aforementioned embodiments, those skilled in the art may clearly understand that the embodiments may be implemented by means of software in conjunction with an essential common hardware platform, or may be simply implemented by hardware. Based on such understanding, the essential part of the aforementioned technical solutions or the part that contribute to the prior art may be embodied in the form of software products. The software products may be stored in computer readable storage media, such as ROM/RAM, magnetic disk, and optical disk, etc., and may include a plurality of instructions to enable a computer device (may be a personal computer, a server, or a network device) to execute the methods described in various embodiments or parts of the embodiments.

The foregoing are merely certain preferred embodiments of the present disclosure, and are not intended to limit the present disclosure. Without departing from the spirit and principles of the present disclosure, any modifications, equivalent substitutions, and improvements, etc. shall fall within the scope of the present disclosure.

What is claimed is:

1. A traffic redirecting method, comprising:
   redirecting a traffic to a proxy service module of a first proxy server; and
   pre-filtering, by the proxy service module, the traffic to match on a pre-redirecting rule;
   if the match is successful, redirecting, by the proxy service module, the traffic based on a traffic redirecting rule corresponding to the matched pre-redirecting rule, and if the match is not successful, recognizing, by the proxy service module, a type of the traffic, and based on a recognition result thereof, selecting, by the proxy service module, a corresponding redirecting rule to redirect the traffic;
   wherein the traffic redirecting rule includes redirecting the traffic back to a source, or redirecting the traffic to a traffic processing server, or redirecting the traffic to a second proxy server, or discarding the traffic.

2. The traffic redirecting method according to claim 1, wherein:
   the first proxy server comprises two operation modes of a local proxy service mode and a remote proxy service mode, when the operation mode of the first proxy server is the local proxy service mode, the redirecting the traffic to the proxy service module of the first proxy server includes redirecting the traffic sent by a client to a local end via a switch policy-based routing, or an ospf (open shortest path first) dynamic routing, or a network bridge direct-connecting manner, and redirecting the traffic to the proxy service module via a traffic hijacking module of the first proxy server; and
   when the operation mode of the first proxy server is the remote proxy service mode, the traffic is processed by other proxy servers and redirected to the first proxy server; the traffic hijacking module of the first proxy server redirects the traffic to the proxy service module of the first proxy server according to an iptables rule corresponding to a type of the traffic.

3. The traffic redirecting method according to claim 2, wherein the redirecting the traffic to the proxy service module via the traffic hijacking module of the first proxy server includes:
   in response to the traffic being a transmission control protocol (TCP) traffic, re-directing the TCP traffic to the proxy service module by configuring the iptables rule;
   in response to the traffic being a user datagram protocol (UDP) traffic, redirecting the UDP traffic to the proxy service module by configuring the iptables rule, using a transparent proxy, and configuring a routing rule; and
   in response to the traffic being an internet control message protocol (ICMP) traffic or generic router encapsulation (GRE) protocol traffic, redirecting the ICMP traffic or the GRE protocol traffic to a loop back address by configuring the iptables rule, creating a mark, and configuring the routing rule, such that the ICMP traffic or the GRE protocol traffic is acquired by the proxy service module.

4. The traffic redirecting method according to claim 3, wherein the pre-redirecting rule includes: an IP address redirecting rule, a port redirecting rule, and a cold-hot IP address rule.

5. The traffic redirecting method according to claim 1, wherein the first proxy server communicates with the second proxy server via a private multiplexing protocol, the first proxy server and the second proxy server configured to provide transparent proxies between the client and servers.

6. The traffic redirecting method according to claim 1, wherein an operation mode of the second proxy server is a remote proxy service mode.

7. The traffic redirecting method according to claim 1, wherein:
   after receiving the traffic, the second proxy server recognizes the traffic, and the traffic is redirected based on the traffic redirecting rule corresponding to the recognition result.

8. The traffic redirecting method according to claim 1, wherein operating system kernels of the first proxy server and the second proxy server are Linux kernels.

9. The traffic redirecting method according to claim 1, wherein the type of the traffic comprises http traffic, p2p traffic, game traffic and pptp traffic.

10. The traffic redirecting method according to claim 3, wherein the step of re-directing the TCP traffic to the proxy service module by configuring the iptables rule comprises: by configuring the iptables rules in the local Linux system, redirecting the destination internet protocol (IP) address and the destination port of the traffic with a protocol type of TCP as the IP address and the TCP port listened by the proxy service module, so that the TCP traffic redirected to the local end is listened and received by the proxy service module.

11. The traffic redirecting method according to claim 3, wherein the step of redirecting the UDP traffic to the proxy service module by configuring the iptables rule, using a transparent proxy, and configuring a routing rule, comprises: by configuring the iptables rule in the local Linux system, the traffic with the protocol type of UDP is established connection with the proxy service module via the transparent proxy, and the UDP traffic is marked, configuring local policy-based routing, and further configuring local routing, and adding a default routing rule to the routing table by designating a routing table to be searched by request of the marked traffic, redirecting the marked UDP traffic to a local loop back address to be received by the proxy service module.

12. The traffic redirecting method according to claim 3, wherein the step of redirecting the ICMP traffic or the GRE protocol traffic to a loop back address by configuring the iptables rule, creating a mark, and configuring the routing rule, comprises: by configuring the iptables rule in the local Linux system, marking the traffic with a protocol type of ICMP or GRE, configuring the local policy-based routing and the routing rule, and designating a routing table searched for by the marked traffic, sending the marked traffic to the local loop back address to be received by the local proxy service module.

13. A traffic redirecting device, comprising:
   a first proxy server;
   a second proxy server;
   a source server; and
   a traffic processing server,
   wherein the first proxy server and the second proxy server are connected and are further connected to the source server and the traffic processing server, respectively, and the first proxy server includes a traffic hijacking module and a proxy service module, the traffic hijacking module configure to redirects a traffic to the proxy service module, and the proxy service module configured to pre-filter the traffic to match on a pre-redirecting rule, to redirect the traffic based on a traffic redirecting rule corresponding to the matched pre-redirecting rule when the match is successful, and to recognizes a type of the traffic, and to select a corresponding redirecting rule to redirects the traffic based on a recognition result when the match is not successful; and wherein the traffic redirecting rule includes redirecting the traffic back to a source, or redirecting the traffic to a traffic processing server, or redirecting the traffic to a second proxy server, or discarding the traffic.

14. The traffic redirecting device according to claim 13, wherein:

the first proxy server is connected to the second proxy server via a switch policy-based routing, or an ospf (open shortest path first) dynamic routing, or a network bridge direct-connecting manner.

15. The traffic redirecting device according to claim 14, wherein:

the switch or the network bridge redirects a traffic from clients to the first proxy server, and the traffic hijacking module redirects the traffic from the clients to the proxy service module.

16. The traffic redirecting device according to claim 13, wherein:

the proxy service module includes a traffic recognition unit, a protocol rule unit configured to store a plurality of traffic redirecting rules corresponding to various traffic recognition results, and a traffic redirecting unit, after the proxy service module acquires the traffic, the traffic recognition unit executes recognition on the traffic, and based on the recognition result, the traffic redirecting unit acquires a corresponding traffic redirecting rule from the protocol rule unit and redirects the traffic based on the traffic redirecting rule.

17. The traffic redirecting device according to claim 16, wherein:

the traffic recognition unit includes an http (hypertext transfer protocol) sub-unit, a p2p (peer-to-peer) sub-unit, a game sub-unit, and a pptp (point-to-point tunneling protocol) sub-unit, and the recognition result is obtained after the traffic has been recognized by the sub-units.

18. The traffic redirecting device according to claim 13, wherein:

the first proxy server communicates with the second proxy server via a private multiplexing protocol, the first proxy server and the second proxy server configured to provide transparent proxies between the client and servers.

19. The traffic redirecting method according to claim 13, wherein the type of the traffic comprises http traffic, p2p traffic, game traffic and pptp traffic.

* * * * *